United States Patent
Takeuchi et al.

(10) Patent No.: US 9,494,091 B2
(45) Date of Patent: Nov. 15, 2016

(54) DRIVING FORCE CONTROL SYSTEM FOR VEHICLE

(75) Inventors: Keisuke Takeuchi, Susono (JP); Kazuo Tsuruoka, Susono (JP);
(Continued)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/238,365

(22) PCT Filed: Sep. 20, 2011

(86) PCT No.: PCT/JP2011/071309
§ 371 (c)(1),
(2), (4) Date: Feb. 11, 2014

(87) PCT Pub. No.: WO2013/042177
PCT Pub. Date: Mar. 28, 2013

(65) Prior Publication Data
US 2014/0195090 A1    Jul. 10, 2014

(51) Int. Cl.
*F02D 29/02*    (2006.01)
*F02D 11/10*    (2006.01)
(Continued)

(52) U.S. Cl.
CPC ............ *F02D 29/02* (2013.01); *B60K 31/00* (2013.01); *B60W 10/06* (2013.01);
(Continued)

(58) Field of Classification Search
None
See application file for complete search history.

(56) References Cited

U.S. PATENT DOCUMENTS 5,114,383 A    5/1992  Hirano et al.
5,557,521 A *  9/1996  Danz ................... F16H 61/0213
                                                              701/57
(Continued)

FOREIGN PATENT DOCUMENTS

DE    102007044401 A1    3/2009
EP         0953470 A2   11/1999
(Continued)

OTHER PUBLICATIONS

Kaneko Satoshi, Machine translation of JP 2005-124282, Mar. 14, 2007, http://worldwide.espacenet.com/?locale=en_EP.*
Jul. 5, 2016 Office Action issued in U.S. Appl. No. 14/347,346.

*Primary Examiner* — John R Olszewski
*Assistant Examiner* — David Merlino
(74) *Attorney, Agent, or Firm* — Oliff PLC

(57) ABSTRACT

A driving force control system for vehicle for controlling a target speed of an engine serving as a prime mover by selecting a control mode based on an index representing a driving preference of a driver. The control mode is selected from a first mode for operating the engine to achieve the target speed while optimizing a fuel economy, and a second mode for operating the engine to achieve the target speed at a speed lower than that achieved while optimizing the fuel economy. The driving force control system is configured to determine a lower limit speed of the engine based on the index provided that the second mode is selected, and to restrict a lower limit value of the target speed of the engine to the lower limit speed in case the target speed of the engine exceeds the lower limit speed under the second mode.

10 Claims, 8 Drawing Sheets

(75) Inventors: Toshio Tanahashi, Susono (JP);
Yoshimitsu Agata, Numadu (JP);
Hiroki Kaneko, Susono (JP); Koji Tsurumura, Toyota (JP)

(51) Int. Cl.
*F02D 31/00* (2006.01)
*B60W 10/06* (2006.01)
*B60W 30/188* (2012.01)
*B60K 31/00* (2006.01)

(52) U.S. Cl.
CPC ........ *B60W 30/1882* (2013.01); *F02D 11/105* (2013.01); *F02D 31/001* (2013.01); *B60W 2710/0644* (2013.01); *Y10S 903/903* (2013.01)

(56) References Cited

U.S. PATENT DOCUMENTS

| | | | |
|---|---|---|---|
| 5,895,435 A | 4/1999 | Ohta et al. | |
| 6,029,107 A | 2/2000 | Sato | |
| 6,066,070 A | 5/2000 | Ito et al. | |
| 6,169,949 B1 | 1/2001 | Sato | |
| 6,275,759 B1 | 8/2001 | Nakajima et al. | |
| 6,637,530 B1 | 10/2003 | Endo et al. | |
| 2003/0216847 A1 | 11/2003 | Bellinger | |
| 2006/0113129 A1 | 6/2006 | Tabata | |
| 2008/0097674 A1* | 4/2008 | Kuwahara | B60W 30/182 701/51 |
| 2008/0228334 A1 | 9/2008 | Hashimoto | |
| 2008/0242500 A1* | 10/2008 | Asaoka | F16H 61/66259 477/44 |
| 2008/0305927 A1 | 12/2008 | Gierling et al. | |
| 2009/0076692 A1 | 3/2009 | Aigner et al. | |
| 2009/0099727 A1* | 4/2009 | Ghoneim | B60W 40/08 701/36 |
| 2009/0181771 A1 | 7/2009 | Sogabe | |
| 2010/0087288 A1* | 4/2010 | Yamamoto | B60L 15/2054 477/3 |
| 2011/0166755 A1* | 7/2011 | Eguchi | B60W 30/188 701/54 |
| 2011/0218720 A1 | 9/2011 | Arai et al. | |
| 2012/0136506 A1 | 5/2012 | Takeuchi et al. | |

FOREIGN PATENT DOCUMENTS

| | | | | |
|---|---|---|---|---|
| JP | S61-192957 A | | 8/1986 | |
| JP | H03-121349 A | | 5/1991 | |
| JP | H10-77893 A | | 3/1998 | |
| JP | H11-294547 A | | 10/1999 | |
| JP | A-2001-112115 | | 4/2001 | |
| JP | A-2005-76673 | | 3/2005 | |
| JP | 2005-113946 | | 4/2005 | |
| JP | 2006-046383 | | 2/2006 | |
| JP | 2005-124282 | * | 3/2007 | ............ B60K 6/445 |
| JP | 2007-198413 | | 8/2007 | |
| JP | 2008-101742 A | | 5/2008 | |
| JP | A-2008-247206 | | 10/2008 | |
| JP | 2008-540951 A | | 11/2008 | |
| JP | A-2009-166516 | | 7/2009 | |
| WO | WO 2011/021634 A1 | | 2/2011 | |

* cited by examiner

DRIVING FORCE CONTROL SYSTEM FOR VEHICLE

TECHNICAL FIELD

The present invention relates to a control system for controlling a driving force of a vehicle, and especially to a control system for adjusting an output of an (internal combustion) engine serving as a prime mover of the vehicle to comply with a driving preference (or intention) of a driver.

BACKGROUND ART

A driving performance, an accelerating performance, a fuel economy etc. of an automobile are significantly influenced by a rotational speed and an output torque of an engine serving as a prime mover of the automobile. In recent days, the speed and the output torque of the engine have been allowed to be controlled independently. Therefore, attempts have been made to improve the driving performance and the fuel economy of a hybrid vehicle whose engine speed can be controlled by a motor, and a vehicle having a continuously variable transmission, utilizing such control function.

For example, Japanese Patent Laid-Open No. 2001-112155 discloses a control apparatus configured to improve the driving performance and the fuel economy of a hybrid vehicle. According to the teachings of Japanese Patent Laid-Open No. 2001-112155, an operating speed of the engine is changed along the operating line for improving the fuel economy when charging the battery. Meanwhile, when increasing a power, an operating speed of the engine is changed along the operating line for generating a larger torque while suppressing an increase in the engine speed, and then the engine speed is changed along the target output line. In turn, Japanese Patent Laid-Open No. 2005-76673 discloses a speed change controller for improving the re-accelerating performance to exit a corner. To this end, the speed change controller taught by Japanese Patent Laid-Open No. 2005-76673 is configured to calculate a required minimum engine rotational speed is calculated based on a required engine output calculated based mainly on a running resistance, and to carry out a speed change including a downshifting during passing on a curve while inhibiting an upshifting to maintain the minimum engine rotational speed. Further, PCT international publication WO2011/021634 discloses a vehicle control system configured to control characteristics of driving force, speed ratio, suspension etc. based on a command index representing driving preference of the driver that is obtained based on a synthesized acceleration of the longitudinal acceleration and lateral acceleration. The command index is increased in accordance with an increase in the synthesized acceleration. However, the command index is maintained to a current value until a satisfaction of a predetermined condition if the synthesized acceleration is decreased.

According to the teachings of Japanese Patent Laid-Open No. 2001-112155, when the drive demand is increased to accelerate the vehicle, the engine is driven away from the optimum fuel line to increase the torque to comply with the demand. However, if the control taught by Japanese Patent Laid-Open No. 2001-112155 is carried out to re-accelerate the vehicle after the required power is reduced, the torque may be consumed significantly to change the engine speed thereby deteriorating the re-accelerating performance. As described, according to the teachings of Japanese Patent Laid-Open No. 2001-112155, the operating speed of the engine is changed along the operating line for generating a larger torque when the required power is increased. That is, when the required power is decreased, the operating speed of the engine is dropped significantly to be changed along the operating line for improving the fuel economy. In this situation, if the required power is increased again to re-accelerate the vehicle, the operating speed of the engine is again raised significantly to the point on the operating line for generating a larger torque. Therefore, the torque may be consumed drastically to increase the engine speed thereby deteriorating the re-accelerating performance.

As also described, the speed change controller taught by Japanese Patent Laid-Open No. 2005-76673 is configured to improve the re-accelerating performance to exit a corner. For this purpose, the speed change controller maintains the engine speed to the required minimum engine speed when the vehicle enters into a corner or during travelling on a curve while inhibiting an upshifting. However, according to the teachings of Japanese Patent Laid-Open No. 2005-76673, the required minimum engine speed is calculated based on the running resistance. That is, although the driving force sufficient to overcome the running resistance can be generated, the driving performance or the accelerating performance may not be adjusted while reflecting a driver's intention sufficiently.

As also described, according to the teachings of PCT international publication WO2011/021634, the command index is increased when the synthesized acceleration is increased. In contrast, when the synthesized acceleration is decreased, the command index is maintained to the current value and prevented from being lowered. However, if an accelerating operation and a decelerating operation are carried out consecutively under the situation where the command index is maintained to a high level, the actual behavior of the vehicle may not be adjusted sufficiently while reflecting the driving preference of the driver represented by the command index.

DISCLOSURE OF THE INVENTION

The present invention has been conceived noting the technical problems thus far described, and its object is to provide a control system for a vehicle in which an engine speed can be controlled to improve a fuel economy, that is configured to re-accelerate the vehicle in a manner to comply with the driving preference of the driver.

According to the present invention, there is provided a driving force control system for vehicle, which is configured to control a target speed of an engine serving as a prime mover by selecting a control mode based on an index representing a driving preference of a driver. Specifically, the control mode is selected from a first mode for operating the engine in a manner to achieve the target speed while optimizing a fuel economy, and a second mode for operating the engine in a manner to achieve the target speed at a speed lower than that achieved while optimizing the fuel economy. In order to achieve the above-mentioned object, the driving force control system is configured to determine a lower limit speed of the engine based on the index provided that the second mode is selected, and to restrict a lower limit value of the target speed of the engine to the lower limit speed in case the target speed of the engine exceeds the lower limit speed under the second mode.

According to the present invention, if the target speed of the engine falls below the lower limit speed, the target speed of the engine is held to the lower limit speed, instead of restricting the lower limit value of the target speed to the lower limit speed.

The lower limit speed is set to the higher speed in accordance with an increase in a value of the index to enhance agility of vehicle behavior.

Specifically, the target speed is a speed of the engine to be achieved under a steady-state running condition where an amount of change in a vehicle speed or an amount of change in a drive demand falls within a predetermined range.

An output of the engine is governed by an engine speed and an output torque. According to the present invention, the control mode is selected from a first mode for operating the engine in a manner to achieve the target speed while optimizing a fuel economy, and a second mode for operating the engine at the target speed to output a larger torque than that under the first mode. The control mode is selected based on the index representing a driving preference of a driver. Under the second mode, the lower limit speed of the engine is also determined based on the index, and if the target speed of the engine (especially under the steady-state running condition) exceeds the lower limit speed, the engine speed is controlled in a manner not to fall below the lower limit speed. Therefore, provided that the vehicle is driven by the high torque rather than improving the fuel economy, the engine speed is maintained to the high speed based on the index representing the driving preference even if the vehicle is decelerated temporarily. In this situation, since the engine speed is thus maintained to the high speed, the engine torque to be consumed to increase the engine speed can be reduced when accelerate the vehicle again. For this reason, a larger driving torque can be used to improve the accelerating performance. Especially, the control system is configured to set the lower limit speed to the higher speed in accordance with an increase in the value of the index representing the driving preference. Therefore, the lower limit speed is set to the higher speed as the higher level of agility is required. For this reason, the vehicle is allowed to be accelerated to comply with the driving preference of the driver.

BEST MODE FOR CARRYING OUT THE INVENTION

The present invention is applied to a vehicle comprised of an internal combustion engine used as a prime mover, or to a vehicle in which a prime mover comprises an engine. For example, the present invention is applied to a hybrid vehicle or a vehicle having a continuously variable transmission, in which an engine speed can be controlled in a manner to achieve a predetermined target speed.

Figure 5:
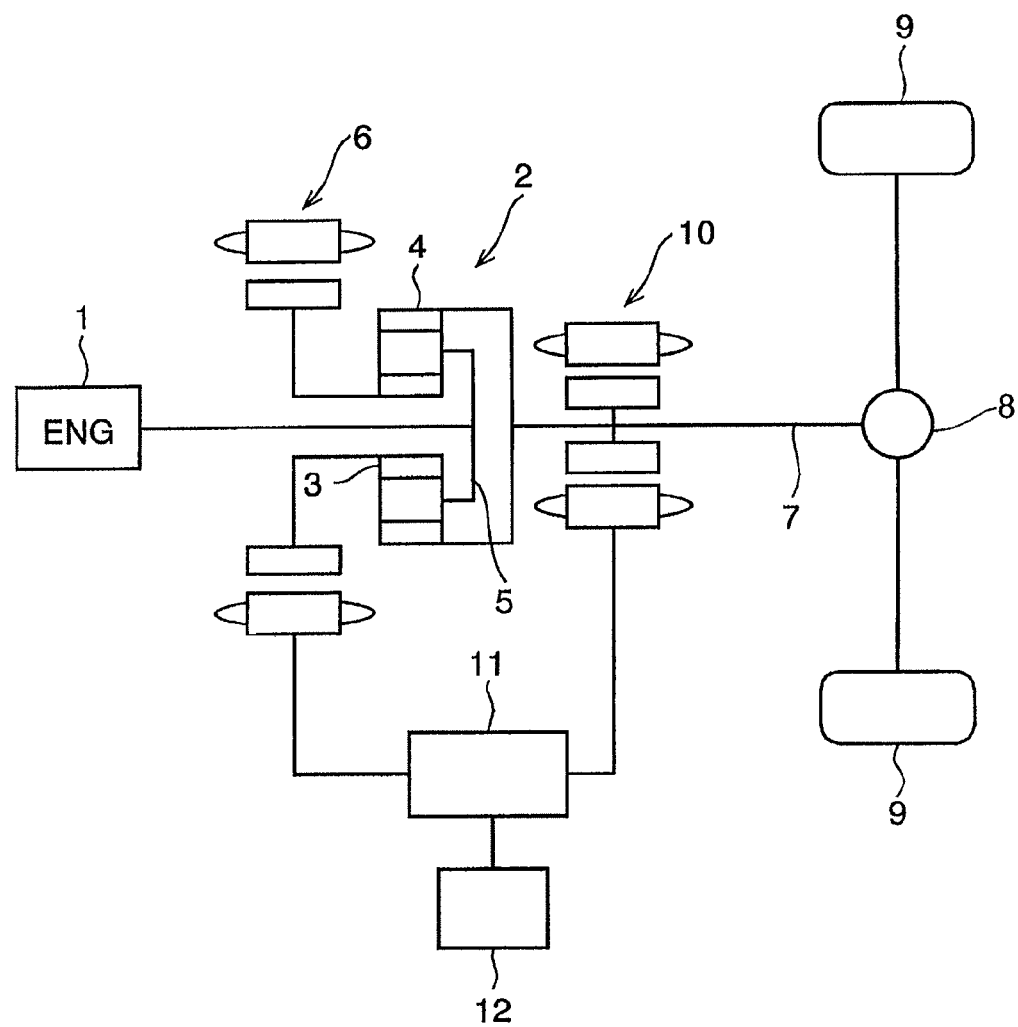
FIG. 5 is a block diagram schematically showing one example of a power train of a hybrid vehicle.

Referring now to FIG. 5, there is shown an example of a power train of the hybrid vehicle. As shown in FIG. 5, an engine 1 is connected with a power distribution device 2 to distribute an output power thereof. In the preferred example shown in FIG. 5, a single-pinion type planetary gear unit adapted to perform a differential action using three rotary elements is used as the power distribution device 2. Specifically, the power distribution device 2 is comprised of: a sun gear 3; a ring gear 4 arranged concentrically with the sun gear 3; and a carrier 5 holding a pinion gear meshing with both the sun gear 3 and the ring gear 4 in a manner such that the pinion gear is allowed to rotate and revolve around the sun gear 3. The carrier 5 is connected with the engine 1 to serve as an input element. A motor 6 (as will be called a "first motor") having a generating function (i.e., a motor-generator) is connected with the sun gear 3 so that the sun gear 3 serve as a reaction element. The ring gear 4 is connected with a pair of driving wheels 9 through an output shaft 7 and a differential 8 to serve as an output element. The ring gear 4 is also connected with a motor 10 (as will be called a "second motor") having a generating function (i.e., a motor-generator). Specifically, the first motor 6 and the second motor 10 are connected with each other via an inverter 11 in a manner to exchange an electric power therebetween. Therefore, the electric power generated by any of the motors 6 and 10 is allowed be stored in a storage device 12. Otherwise, any one of the motors 6 and 10 can be driven by the electric power generated by the other motor 6 or 10. Alternatively, the motors 6 and 10 can also be driven by the electric power supplied from the storage device 12. In the hybrid vehicle thus structured, a rotational speed of the engine 1 can be changed arbitrarily by changing a rotational speed of the first motor 6 serving as a motor or a generator. Here, provided that a gasoline engine is used as the engine 1, an output torque of the engine 1 can be controlled by controlling an opening degree of a throttle valve.

Figure 6:
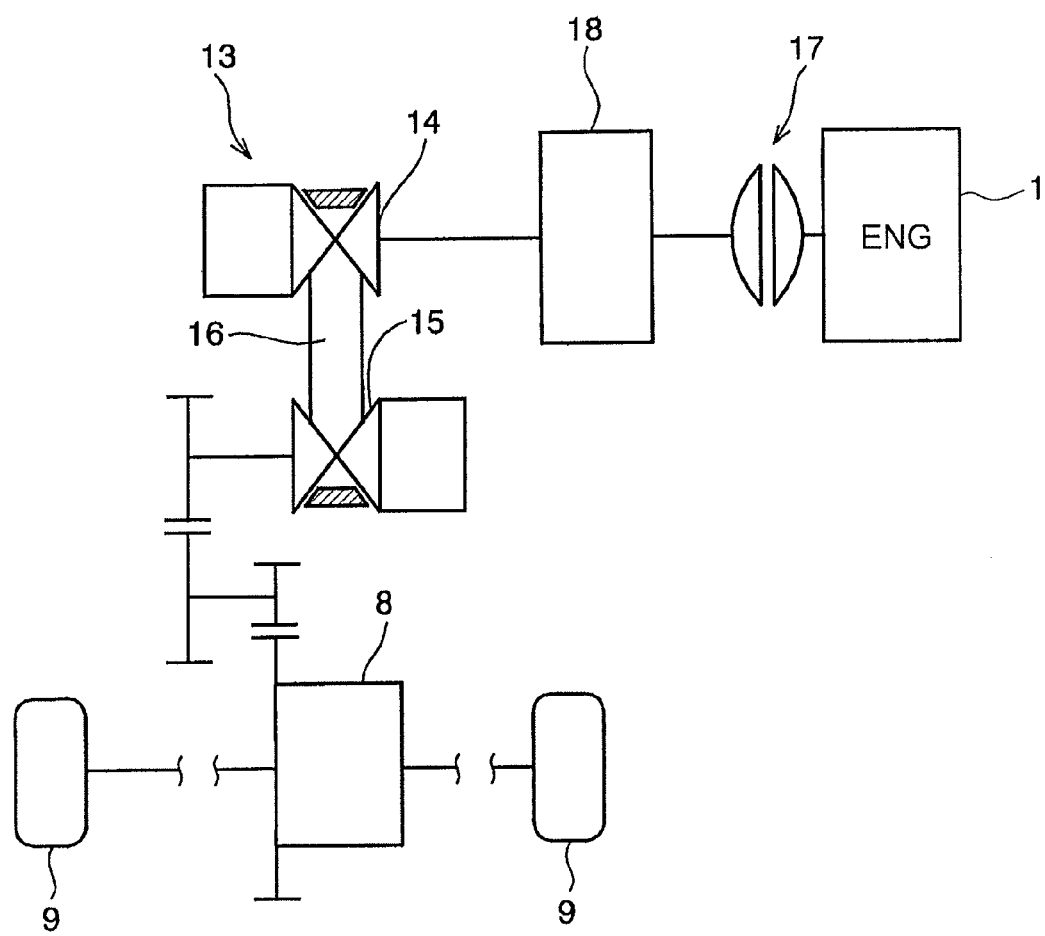
FIG. 6 is a block diagram schematically showing one example of a power train of a vehicle having a continuously variable transmission.

Referring now to FIG. 6, there is shown an example of a power train of the vehicle having a continuously variable transmission 13. As shown in FIG. 6, the continuously variable transmission 13 is comprised of a drive pulley 14, a driven pulley 15, and a belt 16 running on those pulleys 14 and 15. A belt groove of each pulley 14 and 15 can be changed arbitrarily. The drive pulley 14 is connected with the engine 1 through a torque converter 17 and a torque reversing device 18. On the other hand, the driven pulley 15 is connected with a pair of drive wheels 9 through a differential 8. In the vehicle shown in FIG. 6, therefore, a rotational speed of the engine 1 can be changed arbitrarily by changing a speed ratio of the continuously variable transmission 13. Meanwhile, an output torque of the engine 1 can also be controlled by controlling an opening degree of a throttle valve, if it is the gasoline engine.

Thus, the present invention is applied to the vehicle in which the rotational speed of the engine 1 can be controlled arbitrarily (or properly). In the vehicles thus structured, the rotational speed of the engine 1 is basically controlled in a manner such that the fuel economy is improved. For this purpose, a required driving force is calculated based on a vehicle speed and a drive demand represented by an opening degree of an accelerator, and a required output (i.e., a required power) is calculated based on the required driving force and the vehicle speed. The required driving force may also be obtained with reference to a preinstalled map. To this end, an optimum fuel economy line is determined in an engine power diagram where the engine speed is represented by a horizontal axis, and the engine torque is represented by a longitudinal axis. Specifically, in the engine power diagram, the optimum fuel economy line is determined by drawing contour lines representing fuel economy, and connecting points of each contour lines of low speed side at which the fuel economy is optimized. In the engine power diagram, an intersection point of a line representing the required power and the optimum fuel economy line is an operating point at which the required power can be achieved with the lowest fuel consumption. Therefore, such intersection point is employed as a target speed of the engine 1. Accordingly, a target torque of the engine 1 can be calculated by dividing the target power by the target speed. In the hybrid vehicle, the rotational speed of the engine 1 can be adjusted to the target speed by controlling a rotational speed of the first motor 6. Meanwhile, in the vehicle having the continuously variable transmission 13, the rotational speed of the engine 1 can be adjusted to the target speed by electrically controlling a speed ratio of the continuously variable transmission 13. In turn, the output torque of the engine 1 can be adjusted to the target torque by electrically controlling the opening degree of the throttle valve of the engine 1. Specifically, those target power and target speed are target values to drive the vehicle under a steady-state running condition while achieving the drive demand. Here, definition of the "steady-state running condition" is a driving condition in that an amount of change in the drive demand such as the opening degree of the accelerator, and an amount of change in the vehicle speed individually fall within a predetermined small range.

The above-explained control for adjusting the operating point of the engine 1 toward the operating point on the optimum fuel economy line for the purpose of improving the fuel economy corresponds to the first mode of the present invention. However, since the fuel economy is thus improved preferentially under the first mode, it is difficult to improve agility of the vehicle under the first mode by enhancing the acceleration, the braking force and so on. Therefore, the vehicle may not always comply with the driving preference that defers depending on the driver. In order to avoid such a disadvantage, the driving force control system of the present invention is configured to calculate an index representing an intention or a driving preference of the driver based on a behavior of the vehicle or an operating amount of the driver. According to the present invention, therefore, the rotational speed of the engine 1 is controlled based on the index thus calculated.

An example of such index is disclosed as a command SPI in the above-explained PCT international publication WO2011/021634. Hereinafter, the command SPI will be explained in more detail.

Specifically, the command SPI is calculated based on a synthesized acceleration of a longitudinal acceleration and a lateral acceleration. Such synthesized acceleration represents "sportiness in each moment", therefore, the synthesized acceleration is used as an "instant SPI (i.e., an instant sportiness index)". Specifically, the instant SPI is calculated by the following formula:

$$\text{Instant SPI}=(Gx^2+Gy^2)^{1/2}$$

Here, in the above formula, "Gx" is a longitudinal acceleration, and "Gy" is a lateral acceleration.

Preferably, at least one of positive acceleration and negative acceleration (i.e., deceleration) of the longitudinal acceleration Gx is normalized to be used in the above formula. In case of driving the vehicle, an actual negative acceleration is larger than an actual positive acceleration. However, the driver cannot sense such difference between the actual negative acceleration and the actual positive acceleration in most cases. That is, the driver is basically unable to recognize the difference between the actual negative acceleration and the actual positive acceleration. Therefore, in order to correct a gap between the actual acceleration value and the acceleration perceived by the driver, the longitudinal acceleration Gx may be normalized by increasing the detected or calculated value of the positive acceleration, or by reducing the detected or calculated value of the negative acceleration (i.e., deceleration). Specifically, such normalization may be carried out by obtaining a ratio between maximum detected or calculated values of the positive acceleration and the negative acceleration, and multiplying the obtained ratio by the detected or calculated value of the positive or negative acceleration. Alternatively, a detected or calculated value of the negative acceleration value of the lateral acceleration Gy is corrected. For example, a longitudinal driving force and a lateral force generated by a tire can be indicated in a friction circle. Likewise, those normalization or weighting is a process to maintain maximum accelerations in each direction within a circle of predetermined radius by weighting at least one of the positive and negative acceleration values. As a result of such normalization and weighting, an influence of the positive acceleration and an influence of the negative acceleration on the control to change the driving characteristics of the vehicle are differentiated.

Thus, a degree of the gap between the actual acceleration value and the acceleration sensed by the driver differs depending on the direction of the acceleration. For example, the degree of the gap between the actual acceleration value and the acceleration sensed by the driver in the yawing direction of the vehicle is different from that in the rolling direction of the vehicle. Therefore, according to the driving force control system of the present invention, a degree to reflect the acceleration on the control to change the driving characteristics of the vehicle, in other words, a degree to change the driving characteristics of the vehicle according to the acceleration can be differentiated depending on the direction of the acceleration.

Figure 7:
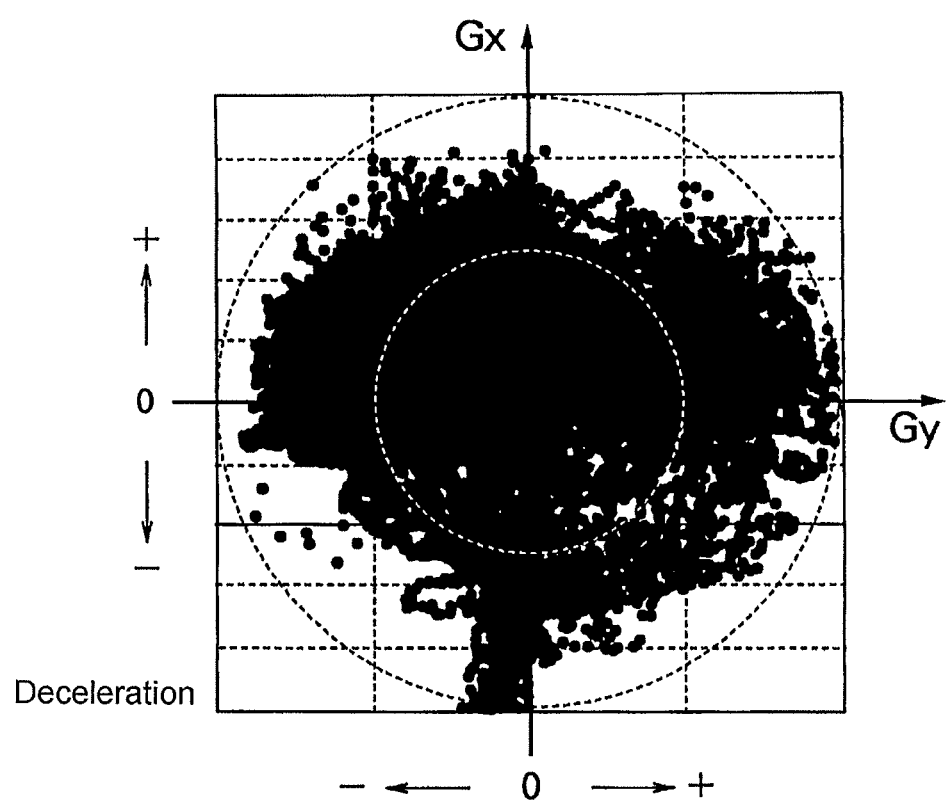
FIG. 7 is a friction circle plotting detected value of longitudinal acceleration and lateral acceleration.

FIG. 7 is a friction circle plotting sensor values of the lateral acceleration Gy and normalized values of the longitudinal acceleration Gx. Those values indicated in FIG. 7 were collected by driving the vehicle in a test course imitating ordinary roads. As can be seen from FIG. 7, the lateral acceleration Gy is not increased frequently in case of decelerating the vehicle significantly, but the lateral acceleration Gy tends to be generated generally within the friction circle.

Figure 8:
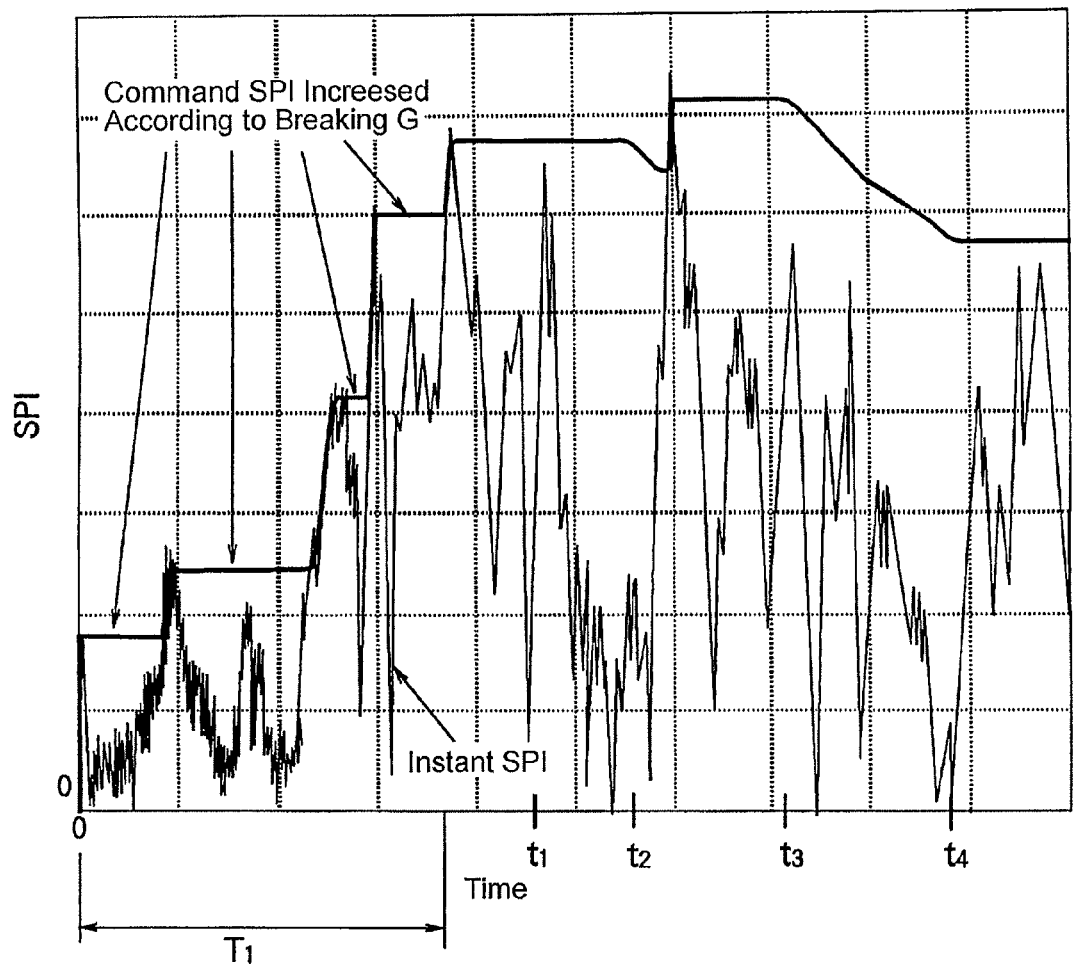
FIG. 8 is a graph indicating an example of a change in the command sportiness index according to a change in an instant SPI.

The command SPI to be used in the control for changing the driving characteristics of the vehicle is obtained based on the instant SPI thus calculated. The command SPI is increased immediately with an increase in the instant SPI, but lowered after a delay with respect to a drop in the instant SPI. Specifically, the command SPI is lowered based on a satisfaction of a specific condition. FIG. 8 is a graph indicating the command SPI being changed according to a fluctuation in the instant SPI changed by an abrupt braking (i.e., by braking G). Specifically, the instant SPI shown in FIG. 8 corresponds to the plotted values indicated in FIG. 7. Meanwhile, the command SPI is set on the basis of a local maximum value of the instant SPI, and the command SPI is maintained until a satisfaction of a predetermined condition.

Thus, the command SPI is increased promptly in the direction to increase the agility of the vehicle behavior but lowered relatively slower in the direction to decrease the agility of the vehicle behavior.

As indicated in FIG. 8, during a period T1 from a commencement of the control, the instant SPI is fluctuated according to a change in the acceleration of the vehicle. Specifically, the instant SPI being fluctuated is increased locally to a maximum value prior to a satisfaction of the predetermined condition to update the command SPI. In this situation, the command SPI is set on the basis of each local maximum value of the instant SPI. Therefore, the command SPI is increased stepwise during the period T1. Then, when the condition to lower the command SPI is satisfied at a time point t2 or t3, the command SPI is started to be lowered. That is, the command SPI is lowered under the situation that maintaining the previous large value of the command SPI is undesirable. Specifically, according to this preferred example, such condition to lower the command SPI is satisfied according to elapsed time.

More specifically, the above-mentioned condition in that "maintaining the previous large value of the command SPI is undesirable" is a situation in which a divergence between the command SPI being maintained to the current value and the current instant SPI is relatively large and such divergence between the indexes is being accumulated continuingly. For example, the command SPI will not be lowered even if the instant SPI is lowered instantaneously in case the accelerator pedal 12 is returned temporarily without intention to decelerate the vehicle by the driver's tendency. However, in case the instant SPI keeps fluctuating below the command SPI for a certain period of time, the aforementioned condition to lower the command SPI is satisfied. Thus, the length of time in which the instant SPI stays below the command SPI may be used as the condition to lower (or alter) the command SPI. In order to reflect the actual driving condition of the vehicle more accurately on the command SPI, a temporal integration (or accumulation) of the deviation between the command SPI being maintained and the instant SPI may be used as the condition to lower the command SPI. In this case, the command SPI is lowered when the temporal integration of the deviation between those indexes reaches a predetermined threshold value. To this end, this threshold value may be determined arbitrarily on the basis of a driving test or simulation. In case of using the temporal integration as the condition to lower the command SPI, the command SPI is to be lowered taking into consideration a duration time of the divergence of the instant SPI from the command SPI, in addition to the deviation between the command SPI and the instant SPI. In this case, therefore, the actual driving condition or behavior of the vehicle can be reflected on the control to change the driving characteristics of the vehicle more accurately.

In the example shown in FIG. 8, a length of time to maintain the command SPI before the time point t2 is longer than a length of time to maintain the command SPI before the time point t3. Those lengths of times to maintain the command SPI are determined by a control to be explained hereinafter. Specifically, as indicated in FIG. 8, the command SPI is increased to a predetermined value at the end of the aforementioned period T1 and maintained. In this situation, the instant SPI rises instantaneously at the time point t1 before the time point t2 at which the condition to lower the command SPI is to be satisfied. Therefore, an integral of the deviation between the command SPI and the instant SPI in this situation is smaller than a predetermined value, and the command SPI is maintained to the time point t2. Here, this predetermined value to lower the command SPI may be set arbitrarily on the basis of a driving test or simulation while taking into consideration a calculation error of the instant SPI. In case the instant SPI is thus raised close to the command SPI, this means that the actual driving condition of the vehicle at this time point is similar to the accelerating and turning conditions represented by the instant SPI upon which the current command SPI being maintained is based. That is, although a certain period of time has elapsed from the time point at which the current command SPI being held was set, the actual driving condition of the vehicle is still similar to the condition at the time point when the current command SPI being maintained was set. Therefore, in this situation, a commencement to lower the command SPI is delayed even if the instant SPI is fluctuating below the current command SPI being maintained. For example, the commencement to lower the command SPI can be delayed by resetting the elapsed time (i.e., accumulation time) or the integral of deviation from the time point at which the current command SPI out was set, and restarting the accumulation of the elapsed time or the integration of the deviation. Alternatively, the commencement to lower the command SPI may also be delayed by subtracting a predetermined value from the elapsed time of the command SPI or the integral of deviation between the command SPI and the instant SPI, or by interrupting the accumulation of the elapsed time or the integration of the deviation for a predetermined period of time.

Figure 9:
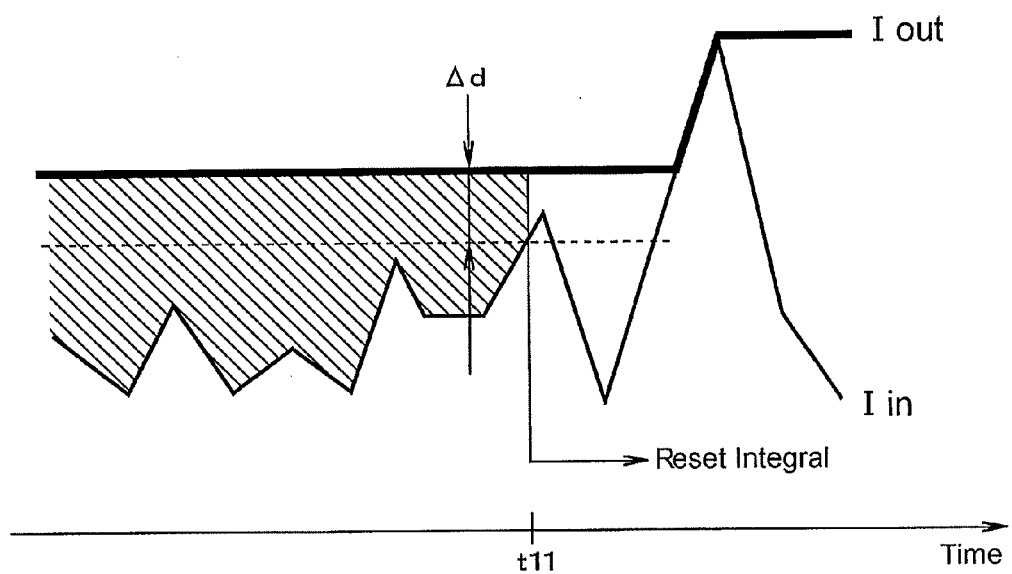
FIG. 9 is a graph indicating the integral of the deviation between the command SPI and the instant SPI, and a reset of the integral.

FIG. 9 is a graph indicating the aforementioned integral of the deviation between the command SPI and the instant SPI, and the reset of the integral. In FIG. 9, a shadowed area corresponds to the integral of the deviation between the command SPI and the instant SPI. In the example indicated in FIG. 9, the reset of the integral of the deviation is executed at a time point t11 at which the divergence between the command SPI and the instant SPI becomes smaller than a predetermined value Δd, and the integration of the deviation between the command SPI and the instant SPI is restarted from the time point t11. Consequently, the condition to lower the command the command SPI and the instant SPI is prevented from being satisfied at the time point t11 so that the command SPI is maintained to the previous value. Then, when the instant SPI exceeds the command SPI after restarting the integration of the deviation therebetween, the command SPI is updated to the new local maximum value of the instant SPI and maintained.

The index representing the driving reference used in the present invention should not be limited to the command SPI. For example, an index calculated based on other kinds of parameters such as an operating amount of the accelerator or a change rate thereof may also be used in the present invention. In this case, it is preferable to lower the index upon satisfaction of a predetermined condition if the parameter on which the index is based is changed to lower the agility of the vehicle, instead of lowering the index immediately after such a change in the parameter.

Figure 1:
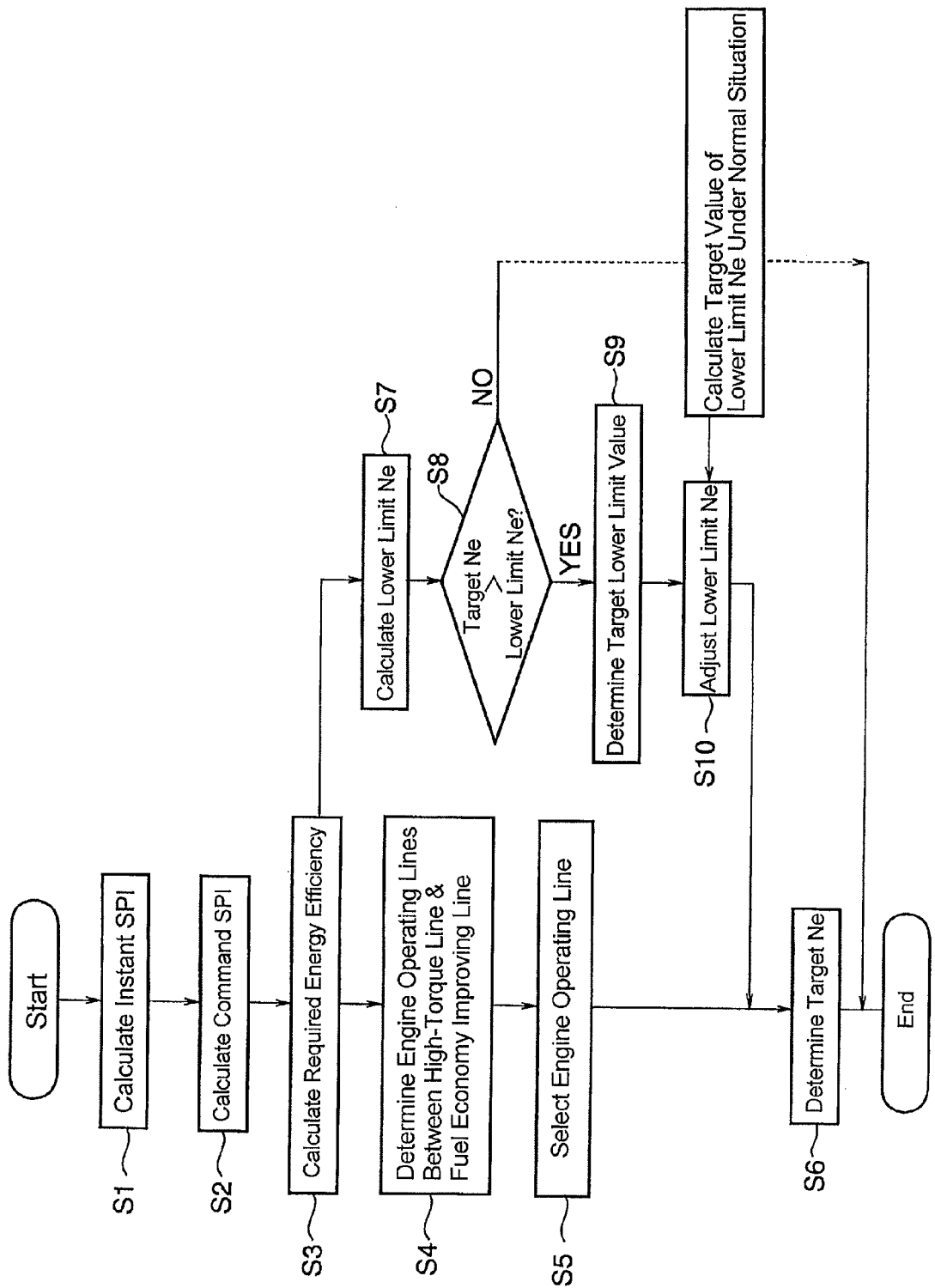
FIG. 1 is a flowchart explaining a control example to be carried out by the driving force control system of the present invention.
Figure 2:
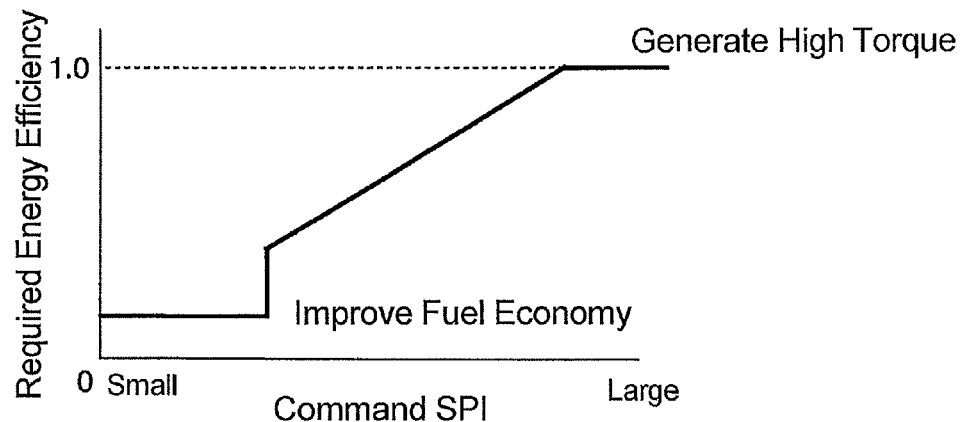
FIG. 2 is a map showing a relation between the command SPI and a required energy efficiency.

According to the driving force control system of the present invention, a second mode where the operating point of the engine 1 is shifted to a high torque side is set on the basis of the index thus calculated, and the re-accelerating performance is adjusted by determining a lower limit speed of the engine 1. Referring now to FIG. 1, there is shown a flowchart explaining a preferred control example using the above-explained command SPI as the index, and the routine shown in FIG. 1 is repeated at predetermined short intervals. First of all, the instant SPI is calculated based on the current running condition or based on a detection value of the acceleration sensor (at step S1), and the command SPI is calculated based on the instant SPI thus calculated (at step S2). Those instant SPI and command SPI are calculated by the foregoing procedures. Then, a required energy efficiency is calculated (at step S3). Specifically, the energy efficiency is a parameter that is increased to the maximum torque possible to be generated at the current engine speed represented as "1" or "100%", in accordance with an increase in the command SPI. A preferred example of the energy efficiency is shown in FIG. 2. Under the situation where the synthesized acceleration is small so that the command SPI is smaller than a predetermined value, the energy efficiency is required to be a value (larger than "0" but smaller than "1") achieved by operating the engine 1 at the operating point on the optimum fuel economy line. In this situation, therefore, the fuel economy is improved. In contrast, under the situation where the synthesized acceleration is large so that the command SPI is large, the required energy efficiency is increased to "1". In this situation, therefore, a higher torque is generated. According to the example shown in FIG. 2, specifically, the value of the energy efficiency is increased gradually from a point at which the value of the command SPI is an intermediate value. That is, the energy efficiency is increased stepwise. The control mode for generating the higher torque by thus increasing the energy efficiency corresponds to the second mode of the present invention.

Figure 3:
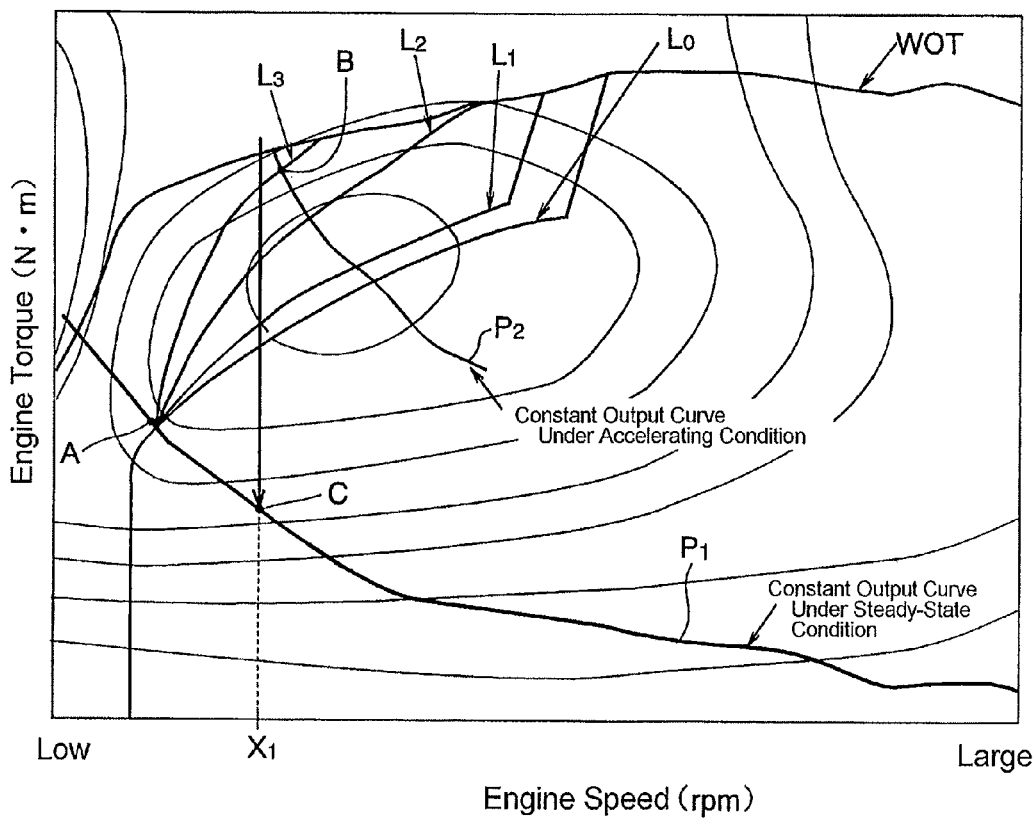
FIG. 3 is a diagram indicating an operating line and an operating point of the engine.

After thus calculating the required energy efficiency at step S3, engine operating lines based on the command SPI are drawn between an operating line of generating the higher torque and an operating line of improving the fuel economy (at step S4). Specifically, the definition of the "operating line" is a line drawn by connecting the engine operating points plotted on a graph where the horizontal axis represents the engine speed and the longitudinal axis represents the engine torque, as the above-explained optimum fuel economy line. Referring now to FIG. 3, there is shown an example of the operating lines. In FIG. 3, reference numerals L0, L1, L2 and L3 represent individual operating lines, WOT represents a power line connecting the operating points to generate the maximum possible engine torque, and P1 and P2 represent individual constant output curves (P1<P2). In addition, thin contour lines are constant fuel efficiency lines drawn individually by connecting the operating points in a manner such that the fuel economy is homogenized. Specifically, the first operating line L0 is similar or approximated to the optimum fuel economy curve, and selected in case the command SPI is smaller than a predetermined value "a". The second operating line L1 is selected in case the value of the command SPI is equal to another predetermined value "b" (>a). Likewise, the third operating line L2 is selected in case the value of the command SPI is equal to still another predetermined value "c" (>b), and the fourth operating line L3 is selected in case the value of the command SPI is equal to still yet another predetermined value "d" (>c). The second to the fourth operating lines L1 to L3 are individually determined based on a result of an experimentation or simulation to achieve predetermined driving performances or characteristics according to need. Number of the operating lines is not especially limited to L0 to L3, and it may be increased and decreased according to need. Thus, the operating lines of this kind can be determined in advance. Therefore, the operating lines may be determined at step S4 with reference to a preinstalled map determining the operating line as shown in FIG. 3.

Then, the operating line is selected in accordance with the command SPI (at step S5). Specifically, one of the operating lines is selected in accordance with the command SPI calculated at step S2, and the engine 1 is operated along with the selected operating line. As described, the target output of the vehicle to which the invention is applied is achieved by operating the engine 1 along with predetermined operating line. For example, in case of generating the target output along with the output curve P1 shown in FIG. 3, an intersection point between the output curve P1 and the operating line selected at step S5 is determined as a target engine speed (i.e., a target Ne) (at step S6).

Figure 4:
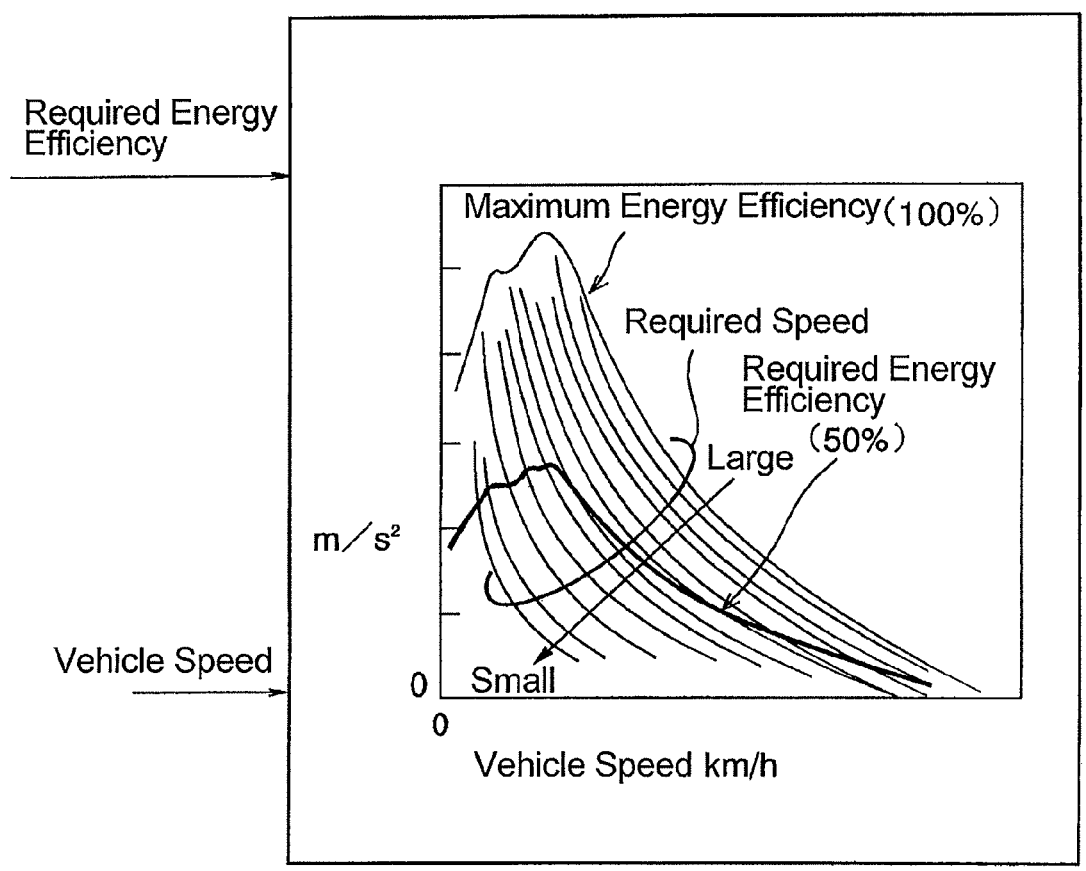
FIG. 4 shows one example of a map for determining a lower limit speed.

After calculating the required energy efficiency at step S3, the engine operating lines are determined on the one hand, but at the same time, a lower limit engine speed (i.e., a lower limit Ne) is calculated (at step S7). Provided that the vehicle is the hybrid vehicle in which the speed ratio is allowed to be changed continuously, a relation between the vehicle speed and the acceleration can be determined in advance with respect to a required speed, as shown in FIG. 4. In order to obtain the acceleration with respect to the current vehicle speed and the required speed, a line representing the above-explained required energy efficiency is added in FIG. 4. Therefore, as the case of obtaining the upper limit value, the lower limit value of the engine speed Ne can be obtained taking into consideration a vehicle weight and so on. Thus, the required speed is determined based not only on the command SPI but also on the selected operating line and the target output. This means that the command SPI, that is, the driving preference of the driver is reflected on the required speed thus determined. Accordingly, the lower limit value of the engine speed Ne (i.e., the lower limit speed) is set to the higher level as a requirement to enhance the agility is increased.

Then, the lower limit engine speed (i.e., the lower limit Ne) thus calculated at step S7 is compared with the target engine speed (i.e., the target Ne) (at step S8). As described, the target engine speed is the speed indicated in FIG. 3 at the intersection point between the selected operating line and the output curve. If the target engine speed is lower than the lower limit engine speed so that the answer of step S8 is NO, the routine is ended without carrying any specific controls. In contrast, if the target engine speed is higher than the lower limit engine speed so that the answer of step S8 is YES, the lower limit value of the target value of the engine speed (i.e., a target lower limit value) used to control the driving force is set to the value calculated at step S7 (at step S9). Thus, if the target value of the engine speed calculated based on the vehicle speed and the drive demand falls below the lower limit value calculated at step S7, the target value of the engine speed is restricted to the lower limit value calculated at step S7. In other words, in case the target speed of the engine falls below the above-explained lower limit value, the engine speed is held to the lower limit value.

Meanwhile, a lower limit target value for the situation in which the operating lines based on the command SPI are not selected, that is, a lower limit target value under the first mode where the first operating line L0 is selected (i.e., a lower limit target value under the normal situation) is also calculated. Therefore, an adjustment between the lower limit target value under the normal situation and the target lower limit value calculated at step S9 is carried out (at step S10). Specifically, the larger target value is selected out of those two target values (i.e., a max select) to enhance the agility of the vehicle behavior. After carrying out such adjustment at step S10, the routine advances to step S6 to calculate the target engine speed based on the lower limit target value thus selected as a result of the max select.

An example of a change in the operating point under the situation in that the control shown in FIG. 1 is carried out is shown in FIG. 3. Provided that the value of the command SPI is small so that the first operating line L0 is selected, and the vehicle is driven by the power indicated by the output curve P1, the engine 1 is driven at the operating point A. In this situation, if the opening degree of the accelerator is increased, or if the longitudinal acceleration or the lateral acceleration is increased so that the command SPI exceeds the predetermined value "d", the fourth operating line L3 is selected. If the operating line is thus shifted to L3 as a result of such increase in the opening degree of the accelerator, the target operating point is shifted to the intersection point B between the operating line L3 and the constant output curve P2.

In FIG. 3, the straight vertical line represented by X1 is the lower limit speed based on the command SPI. In the situation shown in FIG. 3, the operating point B on the constant output curve P2 is higher than the lower limit speed represented by X1. In this situation, if the target output is lowered, the lower limit speed is restricted to the lower limit speed represented by X1, that is, the engine speed Ne is held at the lower limit speed represented by X1. Specifically, if the target output is lowered from the output curve P2 to the output curve P1, the operating point of the engine 1 is shifted to the operating point C on the output curve P1 at the speed represented by X1.

As described, according to the present invention, the index such as the command SPI is held to the current value until the predetermined condition is satisfied, even if the acceleration or the opening degree of the accelerator and so on is reduced so that the instant SPI is lowered. That is, if the operating point is shifted to the point C, the command SPI is still held to the current value (larger than the predetermined value "d") at this moment. In this situation, if the accelerator pedal is depressed for example so that the target output is increased to the output curve P2, the operating point is again shifted to the point B. However, since the lower limit speed of the engine speed is restricted as described so that the engine speed Ne at the operating point C on the constant output curve P1 is held to the high speed, the engine speed Ne is required to be changed only (i.e., increased) in a small amount. Therefore, only a small amount of the torque or power is consumed to change the engine speed Ne even if the target output is thus increased from the output curve P1 to the output curve P2. For this reason, the torque can be used sufficiently to accelerate the vehicle so that the accelerating performance can be enhanced.

Thus, according to the present invention, the lower limit speed is set to the higher speed in accordance with an increase in the command SPI, that is, as the higher level of agility is required. In addition, if the value of the command SPI is large, the engine 1 is driven at the operating point of high speed side. Therefore, even if the drive demand is decreased, the engine speed is to be reduced only to the lower limit speed thus held to the high speed. That is, a reduction amount (i.e., a reduction range) of the engine speed can be reduced. Since the amount (or range) of change in the engine speed is small, the re-accelerating performance after the deceleration can be improved. For this reason, the driver is allowed to re-accelerate the vehicle to comply with his/her driving preference represented by the index.

The above-explained control to change the operating line for controlling the output of the engine 1 may be modified depending on specifications of the engine 1 and the control system thereof. For example, the operating lines may be shifted in a manner to increase the output by increasing an opening degree of the throttle valve with respect to an opening degree of the accelerator. Alternatively, the operating lines may be shifted in a manner to output a higher torque by increasing an intake pressure. Otherwise, the operating lines may be shifted in a manner to output a higher torque by reducing an exhaust pressure, by increasing an air intake and an actual compressibility by adjusting timing or a lift amount of the valve, or by reducing a re-circulating volume of the exhaust gas.

The invention claimed is:

1. A driving force control system for vehicle, which is configured to control a target speed of an engine serving as a prime mover by selecting a control mode based on an index representing a driving preference of a driver, from a first mode for operating the engine in a manner to achieve a target output of the engine while optimizing a fuel economy, and a second mode for operating the engine in a manner to achieve the target output of the engine at a speed of the engine lower than that achieved while optimizing the fuel economy, the driving force control system comprising:
    an acceleration sensor that detects a longitudinal acceleration of the vehicle that is changed by an operation of the driver; and
    a processor that includes control logic, which when executed:
        calculates the index based on at least the longitudinal acceleration of the vehicle that is changed by the operation of the driver and that is detected by the acceleration sensor;
        determines a lower limit speed of the engine based on the index provided that the second mode is selected; and
        restricts a lower limit value of the target speed of the engine to the lower limit speed based on the index in case the target speed of the engine exceeds the lower limit speed under the second mode.

2. The driving force control system for vehicle as claimed in claim 1,
    wherein the lower limit speed is set to a higher speed in accordance with an increase in a value of the index to enhance agility of vehicle behavior.

3. The driving force control system as claimed in claim 1,
    wherein the target speed is a speed of the engine to be achieved under a steady-state running condition where an amount of change in a vehicle speed or an amount of change in a drive demand falls within a predetermined range.

4. The driving force control system as claimed in claim 1,
    wherein the vehicle includes any of:
        a hybrid vehicle, in which the engine is connected with anyone of rotary elements of a power distribution device adapted to perform a differential action using three rotary elements, another rotary element is connected with a motor, and still another rotary element serves as an output element; and
        a vehicle in which a continuously variable transmission is connected with an output side of the engine.

5. The driving force control system as claimed in claim 1,
    wherein the index is increased promptly in the direction to increase the agility of the vehicle behavior, in accordance with an increase in a synthesized acceleration of the longitudinal acceleration and a lateral acceleration of the vehicle that is obtained based on a sensor value or an operating amount of the driver, but lowered relatively slower in the direction to decrease the agility of the vehicle behavior with respect to a reduction in the synthesized acceleration.

6. A driving force control system for vehicle, which is configured to control a target speed of an engine serving as a prime mover by selecting a control mode based on an index representing a driving preference of a driver, from a first mode for operating the engine in a manner to achieve a target output of the engine while optimizing a fuel economy, and a second mode for operating the engine in a manner to achieve the target output of the engine at a speed of the engine lower than that achieved while optimizing the fuel economy, the driving force control system comprising:
- an acceleration sensor that detects a longitudinal acceleration of the vehicle that is changed by an operation of the driver; and
- a processor that includes control logic, which when executed:
  - calculates the index based on at least the longitudinal acceleration of the vehicle that is changed by the operation of the driver and that is detected by the acceleration sensor;
  - determines a lower limit speed of the engine based on the index provided that the second mode is selected; and
  - holds the target speed of the engine to the lower limit speed based on the index, in case the target speed of the engine exceeds the lower limit speed under the second mode, and then falls below the lower limit speed.

7. The driving force control system for vehicle as claimed in claim 6, wherein the lower limit speed is set to a higher speed in accordance with an increase in a value of the index to enhance agility of vehicle behavior.

8. The driving force control system as claimed in claim 6, wherein the target speed is a speed of the engine to be achieved under a steady-state running condition where an amount of change in a vehicle speed or an amount of change in a drive demand falls within a predetermined range.

9. The driving force control system as claimed in claim 6, wherein the vehicle includes any of:
- a hybrid vehicle, in which the engine is connected with anyone of rotary elements of a power distribution device adapted to perform a differential action using three rotary elements, another rotary element is connected with a motor, and still another rotary element serves as an output element; and
- a vehicle in which a continuously variable transmission is connected with an output side of the engine.

10. The driving force control system as claimed in claim 6,
wherein the index is increased promptly in the direction to increase the agility of the vehicle behavior, in accordance with an increase in a synthesized acceleration of the longitudinal acceleration and a lateral acceleration of the vehicle that is obtained based on a sensor value or an operating amount of the driver, but lowered relatively slower in the direction to decrease the agility of the vehicle behavior with respect to a reduction in the synthesized acceleration.

* * * * *